United States Patent
Serebrennikov

(10) Patent No.: US 7,299,120 B2
(45) Date of Patent: Nov. 20, 2007

(54) METHOD FOR REDUCING JUDDERING VIBRATIONS

(75) Inventor: Boris Serebrennikov, Buhl-Kappelwindeck (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/906,907

(22) Filed: Mar. 11, 2005

(65) Prior Publication Data

US 2005/0189192 A1   Sep. 1, 2005

Related U.S. Application Data

(63) Continuation of application No. PCT/DE03/02989, filed on Sep. 10, 2003.

(30) Foreign Application Priority Data

Sep. 12, 2002   (DE) ................. 102 42 225

(51) Int. Cl.
  *G06F 7/00*   (2006.01)
  *G06F 17/00*  (2006.01)
(52) U.S. Cl. .............. 701/67; 701/37; 701/51; 701/84
(58) Field of Classification Search ............ 701/37, 701/67, 84, 50, 51, 54, 70, 79, 110; 180/170; 192/30 R
See application file for complete search history.

(56) References Cited

U.S. PATENT DOCUMENTS

| | | | |
|---|---|---|---|
| 4,713,763 A | 12/1987 | Hofmann | |
| 5,759,133 A | 6/1998 | Treinies et al. | |
| 6,035,984 A | 3/2000 | Kosik et al. | |
| 6,631,319 B1 * | 10/2003 | Luh ....................... | 701/54 |
| 2002/0047417 A1 | 4/2002 | Tebbe | |
| 2002/0049118 A1 | 4/2002 | Vornehm et al. | |

FOREIGN PATENT DOCUMENTS

| | | |
|---|---|---|
| DE | 4009792 | 10/1991 |
| DE | 19949449 | 5/2001 |
| GB | 2305743 | 4/1997 |

* cited by examiner

*Primary Examiner*—Gertrude A. Jeanglaude
(74) *Attorney, Agent, or Firm*—Simpson & Simpson, PLLC

(57) ABSTRACT

Juddering vibrations are reduced in a motor vehicle drive train that is loadable by a drive device comprising an internal combustion engine, a clutch device and a transmission device, by performing the steps of (i) determining whether juddering vibrations are present; (ii) disposing or coupling in or to the motor vehicle drive train a device selected from the group consisting of an internal combustion engine, a clutch device and a transmission device; (iii) assigning a rotary parameter to a drive train component, wherein the parameter is torque or speed, and (iv) adjusting at least one of the devices to counteract the juddering vibrations, where in response to the adjusting, the rotary parameter is modified and in response to modifying the rotary parameter, the juddering vibration is modified over time.

66 Claims, 6 Drawing Sheets

Three points in the calculation of the median

Transmission input speed $T_{i\_Rotary\ speed}$

Actual travel of the clutch servo unit $\triangle t = t_{max\_Weg} - t_{max\_Rotary\ speed}$

METHOD FOR REDUCING JUDDERING VIBRATIONS

CROSS REFERENCE TO RELATED APPLICATIONS

This application is filed under 35 U.S.C. §120 and §365(c) as a continuation of International Patent Application PCT/DE2003/002989, filed Sep. 10, 2003, which application is incorporated herein by reference. This application also claims priority of German Patent Application 102 42 225.7, filed Sep. 12, 2002, which application is incorporated herein by reference.

FIELD OF THE INVENTION

The invention relates to methods for reducing juddering vibrations and an electronic controller.

BACKGROUND OF THE INVENTION

Electronic controllers are already known. They are used, for example, in the automotive area to control certain functionalities of components, such as transmission, clutch, internal combustion engine or similar items.

A known method for reducing or gradually eliminating juddering vibrations that are present in the drive train of a motor vehicle is such that the vehicle is brought to a standstill. In this case, for example, a service brake may be operated and the shifted gear disengaged. If the vehicle comes to a stop and the starting clutch is completely disengaged, juddering vibrations as a rule are gradually eliminated.

SUMMARY OF THE INVENTION

The object of the invention is to produce a method for reducing juddering vibrations that is operationally reliable and ensures a good comfort, as well as an electronic controller.

The objective is achieved in particular via a method for reducing juddering vibrations in a motor vehicle drive train that can be loaded by a drive device, such as an internal combustion engine, and has a clutch device as well as a transmission device, comprising the steps:

Determining whether juddering vibrations are present and/or establishing that juddering vibrations are present;

Adjustment, and especially automatic adjustment, of a device in order to counteract the juddering vibrations, this device being disposed in the drive train or coupled thereto in such a manner that a rotary parameter, such as torque or speed, that is assigned to a drive train component is modified by adjustment of this device, and the course of the juddering vibration, as a result of this change, is modified over time.

In particular, a method for reducing juddering vibrations that occur in a motor vehicle drive train is provided. This motor vehicle drive train may be loaded by a drive device. Such a drive device may be, for example, an internal combustion engine. Also provided in the drive train are a clutch device and a transmission device. The clutch device may, for example, be an electronically controlled clutch device. Such an electronically controlled clutch device may be configured, for example, like an electronically controlled clutch device offered by the applicant under the designation "Electronic Clutch Management" (EKM). However, an electronically controlled clutch device may also be configured differently.

The transmission device may be of any type. It may be shifted in such a manner that it is possible to select different ratios. It may have, in particular, shift steps or be continuously variable. For example, the transmission device may be an automatic transmission or an automated-shift transmission (ASG) or a continuously variable transmission (CVT). Also other types of transmissions may be used.

The method for avoiding juddering vibrations may in particular be such that the juddering vibrations are "weakened" without them being eliminated. However, this does not necessarily mean that the juddering vibrations are immediately reduced or eliminated. The method may also be such that only in the course of the method are the juddering vibrations counteracted, while in some cases, in the meantime, the juddering vibrations are assisted, especially in an undesired way. However, the method may also be such that the juddering vibrations are directly counteracted.

It is provided in particular according to the invention that a check or determination is made of whether juddering vibrations are present. This does not necessarily mean that it is absolutely guaranteed that the juddering vibrations are present. It may be provided, for example, that it is not excluded or assumed that or whether juddering vibrations are present. The determination of juddering vibrations may also be such that certain measures are also implemented from which it is concluded that juddering vibrations are present. For example, this may be such that—and there are also many additional possibilities—that the speed of the transmission input shaft is examined and a vibrating characteristic, or a characteristic in which a vibration is shifted, is evaluated as a sign that juddering vibrations are present.

It is further provided according to the invention that a device is adjusted in order to counteract the juddering vibrations. This adjustment preferably occurs in an automatically and/or electronically controlled manner. The device that is adjusted is disposed within the drive train or coupled thereto in such a manner that, by adjusting this device, a rotary parameter assigned to a drive train component is changed. Such a rotary parameter may in particular be a torque or a rotary speed. The aforementioned device, in a preferred embodiment, is the clutch device. This device may, however also be a different device. For example, this device may also be the engine or a throttle valve or the like. Thus, the throttle angle could be changed, for example, in order to change the engine speed or the engine torque. It is also preferred that juddering vibrations be counteracted by specific shift operations of the transmission.

However, for the sake of simplification, the invention may be illustrated using a design in which the device in question is a clutch device, and a rotary parameter assigned to a drive train component is changed via an adjustment of this clutch device. However, it should be noted that another device might be used accordingly instead of this clutch device.

According to the invention, it is provided in particular that the adjustment of the device, in the preferred example a clutch device, changes the time characteristic of the juddering vibration. This change is preferred so that the juddering vibration is reduced or even gradually removed.

Juddering vibrations are, in the sense of the invention, in particular vibrations of the transmission input against the vehicle. Quantitatively, the judder may be represented by the relative speed $\omega_{Grabbing}$, which may be represented in particular as the difference of the angular or rotary speed of the transmission input, on the one hand, and the product of the shifted gear ratio ($i_{Gear}$) or the ratio assigned to the shifted gear and the angular or rotary speed of the driven wheel ($\omega_{Wheel}$). However, in some cases other ratios could also be considered. However, the invention is not limited by the indicated connection. There may also be designs in which the judder may be quantitatively expressed in another manner.

The method of the invention may also be used in particular to prevent self-excited juddering vibrations. In self-excited juddering, the relative rotary or angular speed of the juddering ($\omega_{Grabbing}$) vibrates with an intrinsic frequency that may be, for example, in the range of 10 Hz. However, other frequency values are also possible.

In a preferred embodiment, it is provided that the torque that is transmissible by the clutch device and/or the clutch control travel is modulated in order to counteract the juddering vibrations. For many clutches there exists a connection between the torque transmissible by the clutch and the clutch control travel. However, there may also be clutches in which, for example, it is possible to change the transmissible torque without a clutch control travel being changed. Likewise, the connection between the transmissible torque and the clutch control travel may be at least in part such that a travel change does not or does not always cause a change to the transmissible torque. Cited as an example of this, is that a clutch is disengaged far enough that it no longer transmits any torque; in clutches of this type, it is frequently provided that the clutch control travel in this disengaged state, in which no torque is transmitted, may be changed.

For the sake of simplicity, in the following regarding such designs one speaks of a change of the modulation of the clutch control travel. However, it should be noted that a modulation or change of the torque transmitted by the clutch may likewise be provided. In the preferred embodiment, it is therefore preferably provided that, even if only the clutch control travel is mentioned, the corresponding designs relate to the torque transmissible by the clutch.

It should be noted is the transmissible clutch torque or torque transmissible by the clutch is especially preferred is the reference clutch torque, and the clutch control travel is especially preferred is the reference clutch control travel. These reference quantities may be prescribed and then driven, for example, by a control device. This relates in particular to characteristic values that are modulated.

It is especially preferred that the clutch control travel is modulated to reduce the vibrations in a vibrational manner, especially sinusoidally. This modulation may in particular be such that a sinusoidal function is superimposed on a particular prescribed or controlled clutch position or a clutch control travel or the time characteristic of these parameters.

In a preferred embodiment, a prescribed parameter of the time characteristic of the juddering vibration and/or a rotary parameter of a drive train component is calculated. Such a parameter or rotary parameter may be, for example, the transmission input speed. The transmission input speed may also be used, for example, to check whether juddering vibrations are present.

This parameter or rotary parameter may, for example, also be estimated or calculated or measured. Such a parameter may, for example, also be the amplitude and/or the duration of period and/or the phase of the juddering vibration or the angular speed or rotary speed of a drive component.

Especially preferred is the phase and/or the amplitude and/or the duration of the juddering vibration is calculated as a function of the transmission speed or as a function of the time characteristic of the transmission input speed.

In a preferred embodiment, the phrase and/or the amplitude and/or the duration of period of the vibration modulation of the clutch control travel is calculated as a function of the speed. The transmission input speed may be estimated, for example, or calculated. In a preferred embodiment, the transmission input speed is measured, and a suitable measuring device is provided. Such a measuring device may be configured in different ways. A preferred measuring device is designed in such a manner that speed signals are provided at time intervals.

In a preferred design it is provided that the period and/or the phase and/or the amplitude of the modulated clutch control travel is determined as a function of at least one local extremum of the transmission input speed. This local extremum may in particular be a local maximum.

In this context, the local extremum of the transmission speed may in particular be calculated or estimated or measured.

It is preferable that the local extremum be determined in a manifold manner. In so doing, it is possible to increase the degree of precision of this determination. For example, it may first be provided that such a local extremum is determined using measured values at time intervals and then the precision is increased by a calculation being made as a function of these measured values or, in some cases, additional factors.

It is also preferable that local extremum of this type in the time characteristic of the transmission input speed, which may in particular be local maxima, are used to determine the phase of the transmission input speed. It may also be provided in this embodiment that the transmission input speed in this context was measured or calculated or estimated. Moreover, as previously illustrated, a manifold determination of the local extrema or the phases may be carried out, and especially in such a manner that the degree of precision is increased.

Especially in the determination of the phase of the transmission input speed or the juddering vibration, it may be provided that different influences which could cause a deviation of timing position of the extrema and maxima from the actual one are taken into consideration in order to obtain more precise values for the extrema, especially maxima, of the transmission input speed or the juddering vibration.

In a preferred embodiment, the modulation of the clutch control travel is carried out in such a way that, within the context of the precision, the phase and the period essentially correspond to those of the speed of the transmission input shaft, or those which were determined in relation to the speed of the transmission input shaft. It is also preferred that the amplitude of the modulated clutch control travel be prescribed to be proportional to the judder amplitude of the transmission input speed. The judder amplitude is especially preferably defined from a comparison between the filtered and unfiltered transmission input speed. In this context it is provided in particular that the transmission input speed, on the one hand, is treated as a transmission input speed with a vibrating portion and, on the other hand, as a transmission input speed without a vibrating portion; the latter may in particular be an average transmission input speed. In this context, the non-vibrating one is the filtered one, while the vibrating one is the unfiltered one. In a preferred form, it is also provided that at least first and in a first step, the amplitude of the transmission input speed is determined in such a way that the speed is determined within specified evaluation periods or interrupts. These interrupts may have a specific duration, such as 2.5 ms or 5 ms or 10 ms. Other values for this duration are also preferable. Another type of speed measurement or calculation may also be provided.

In such a preferred design, in which the speed is determined within prescribed interrupts, it may be provided in particular that during this interval pulses of rotary transducer are counted and set in a ratio with the time. In the maximum search, it is possible, for example, to check how the particular rotary speed values, which may each be assigned to a particular interrupt, behave in comparison to the adjacent rotary speed values. Using such a comparison, a local maximum may, for example, be determined for the rpm's or speed. In a preferred embodiment, it is provided that a first parameter of the juddering vibration and/or the time characteristic of the transmission input speed, especially an extremum such as a maximum, is determined via an estimation and/or a calculation and/or a measurement in a first step. This may, for example, be such that a maximum search is carried out in the aforementioned manner.

Preferably, to improve and/or check the precision of the parameter calculated in the first step, this first parameter is determined in a second step as a function of the result of the first step. To this end, for example, calculations or other measures that increase the precision may be made. In a preferred, very specific embodiment of the invention, it may be provided, for example, that using speed signals set a time intervals that were calculated in the aforementioned manner, for example, via rotary transducer, local maxima are calculated by comparison with adjacent signals. Next, the deviation of the timing position of an actual maximum may be determined, for example, via calculation. Using different calculations, it is possible to consider, for example, deviations that have different causes, such as a deviation that is attributable to the fact that rpm or rotary speed signals at the time are provided only at time intervals, or deviations that are required by a non-vibrating portion of the time characteristic of the rpm's, or deviations that are required by the evaluation. It should be noted that the invention is not to be limited by preferred, exemplary embodiments. In particular, a plurality of additional exemplary embodiments may be provided in which a characteristic is determined in the first step and then the precision is improved or reviewed in a second step.

Such a parameter may in particular be a local extremum of the time characteristic of the transmission input speed.

It is also preferable that, using this parameter, which is determined in a first and a second step, or the difference of these parameters, calculated in different steps, an additional characteristic, such as the phase of the transmission input speed, is calculated.

Especially preferably according to the invention the transmission input speed is only measured and/or evaluated so that tachometers are provided at time intervals. In a first step, at least one local extremum, such as a local maximum of these measured values can be determined in this design. This may, for example, be such that the local extremum is determined via a comparison to the adjacent measured values of the time characteristic. In particular, it may be provided that for the case that a plurality of local extrema are detected, the last one to occur is selected. In this preferred embodiment, the local extremum in some cases may deviate from the actual local extremum because only individual measured values, which in some cases are also average values, and which are set at time intervals are taken into consideration. In this preferred embodiment, it is especially preferred that in a second step, the actual local extremum or maximum of the transmission input speed is more closely approximated or calculated. It is also preferable that the time interval or the deviation between the timing position of the extremum calculated in the first step and the local extremum or local maximum calculated in the second step is calculated.

In the following, for the sake of simplicity, only a local maximum is discussed, it being acknowledged that a local minimum by all means may be used. Depending on the purpose of use other characteristic values may also be used, if necessary. Therefore, for example, zero crossings of the vibrating portion could also be used for phase determination, whereby in this case, if necessary, consideration would be made of whether the vibrating portion is transitioning from the negative range into the positive range or vice-versa.

In a preferred embodiment, the phase angle of the transmission input speed is calculated, and in particular is roughly calculated, in a first phase. For this purpose, local extrema or zero crossings could be used, in some cases while taking into consideration the slope. Therefore, an extremum of this type may be, for example, a local maximum that is used on the basis of speed signals that are spaced at time intervals, which are each provided, depending on the particular case, for an interrupt or an evaluation period. In a manner already illustrated, this may, for example, be such that rpm signals are compared with adjacent ones, and based on such comparisons, individual rpm signals are considered as a local extremum. In this context, it may be provided that the deviation between the phase angle determined in the first step and the actual phase angle of the transmission input speed is calculated or approximated in a second step. This may in particular be such that, based on the deviation of the timing position between a local maximum determined in the first step and a local maximum determined in the second step corresponding to or at least approximating the actual one, the phase shift is determined.

In a preferred embodiment, the invention provides that in the determination of such a deviation, if this is the case, the fact that rpm signals spaced at time intervals are used is taken into consideration. It is also especially preferable that measurement accuracy, which is directly required by the rotational speed sensing measurement in the first step, is taken into consideration.

One example which, however, should not limit the invention is such that a deviation, or as a part of the deviation, the quotient from an angle $\phi_{Pulse}$ and two times a local extremum of the angular speed $\omega_{max}$ that was calculated in the first step, is considered as the deviation. The angle $\omega_{Pulse}$ would in this example be an angle that is present between two adjacent teeth of a speed sensor. The aforementioned deviation is also called $d_{Pulse}$ for the sake of simplicity.

It is also preferable that a partial deviation be considered, which is attributable to the fact that a control or an evaluation, especially an evaluation of the transmission speed, only takes place once within a prescribed time frame or time interrupt ($T_{int}$), and therefore, only one value is considered for the transmission speed—if this is the case. This may, to cite one example, be such that a speed sensor provided with teeth enables pulses to be detected corresponding to its number of teeth, and in a prescribed time interval, such as 2.5 ms or 5 ms or 10 ms, the number of pulses are counted and from this the speed or the wind velocity derived for the time interval. In this context, for example, a deviation from an actual value of the timing position of an extremum that is required as a result may be considered. This may, for example, be such that the deviation required thereby, which for the sake of simplicity is called $d_{Interrupt}$ or $d_{Int}$, is calculated as follows:

$$d_{interrupt} = 0.5 * T_{int} + 0.5 * (Median - t_{max}) * [3 * \omega_{max}/(d^2\omega/dt * T_{int}^2 + 5/4],$$

whereby $T_{int}$ is the duration of the evaluation time interval or interrupt; Median is a median that describes the focal point of predetermined evaluation pairs, such as three evaluation pairs, that indicates an assignment of the angular speed or rotary speed of the transmission input shaft at particular instants; $T_{max}$ is an instant at which a local maximum $\omega_{max}$ or $\omega_i$ of $\omega$ is determined in a first step; and $d^2\omega/dt$ is the second time derivative of $\omega$.

In a preferred embodiment, in determining the deviation, any increase of the transmission input speed, which is essentially independent of the juddering vibration or transmission speed vibration, may also be considered. This may also be an average drop of the transmission speed.

This deviation, which is called $d_{Gradient}$ for the sake of simplicity, may be described in the approximation as the quotient of the total or average slope B of the transmission input speed and the product of Amplitude A, or the last measured amplitude value of the vibrating portion of the transmission speed, which essentially corresponds to the last found or detected maximum of the vibrating portion of the transmission speed, and the square of $\omega_{Grabbing}$ whereby $\omega_{Grabbing}$ corresponds to $(2*\pi)$ times the juddering frequency.

Preferably, the deviation is calculated on the basis of the following equation:

$$t_{Peak} - t_{max} \approx -d_{Interrupt} - d_{Gradient} - d_{Pulse},$$

$t_{Peak}$ being the instant at which the actual extremum or maximum is present or a value that more closely approximates this value compared to the one given for $T_{max}$, and "≈" indicating that there is an approximate correlation.

In a preferred embodiment, one, several or all of the following values or parameters are considered for the—or in the—determination of the deviation, that is, in particular a deviation between a local extremum, such as a local maximum, of the transmission input speed determined in a first step and the actual extremum or the value for this local extremum or maximum that approximates the actual extremum, or maximum, in a second step.

A first parameter is the interrupt time $T_{int}$. This interrupt time is the duration of a period in which an evaluation or measurement evaluation occurs once and for which a measured value or measured value pair is provided once. This may also be such that a measured value or measured value pair is provided multiple times for this interrupt time $T_{int}$. A predetermined number, for example, may be prescribed. The evaluation may in particular be the evaluation of the angular speed or speed of the transmission input shaft, that is, in particular the value whose extremum or maximum is to be determined.

Another parameter is a median. This median describes the focal point of prescribed measured value pairs. This may in particular be an assignment of the angular speed or rotary speed of the transmission input shaft at instants in which these angular speeds are each present.

For example, it may be predetermined that the median is specified as the focal point of a plurality of assignment pairs that assign the rotary speed or angular speed of the transmission input shaft to the instant at which the particular angular speed has occurred or was present or was picked up.

In this context it may be provided that assignment pairs of this type are provided at timed intervals. Moreover, it may be provided in this context that the median indicates the focal point of three adjacent value pairs. It may in particular be provided that the average of three such value pairs is a local extremum, especially one determined in a first step, such as a local maximum of such value pairs. In this case, it may also be provided that the time interval in which this value pair is provided is essentially the same. This time interval may correspond, for example, to the interrupt time $T_{int}$ and, to name one example, be 2.5 ms or 5 ms or 10 ms. However, other time intervals may be also considered. In this way, for example, in an especially preferred exemplary embodiment, in which three value pairs of the angular speed of the transmission input rotary speed, and the corresponding instants in time $(T_{int})$ at which these value pairs occur, the medians may be calculated as follows:

$$Median = t_{max} + (\omega_{i+1} - \omega_{i-1}) * T_{interrupt}/(\omega_{i-1} + \omega_{i+1}),$$

whereby $\omega_{i-1}$, $\omega_i$, and $\omega_{i+1}$, were measured or calculated in the sequence indicated by their indices and $\omega_i$ is the largest of these three measured values; furthermore whereby each is assigned two adjacent measured values of the three in the time interval of $T_{Interrupt}$ and $\omega i$ is assigned instant $t_{max}$.

An additional parameter present that may be an instant $t_{max}$ that is present or picked up if a local extremum, such as a local maximum, related to the rotary speed or angular speed signals of the transmission input shaft provided at timed intervals—related to the first step. These rotary speed or angular speed signals set a timed intervals or the assignment of them to the instants at which they are present, may in particular be determined in a first step.

Another exemplary parameter is a local extremum, such as a local maximum $(\omega_{max})$, that is related to rotary speed or angular speed signals of the transmission input shaft provided at timed intervals. In the above formula for the median, this $\omega_{max}$ preferably corresponds to $\omega_i$. $\omega_{max}$ or $\omega_i$ may preferably have been determined in the first step.

A further exemplary parameter is the amplitude (A) of the juddering vibration. This is in particular the last set amplitude of the juddering vibration or the last set local maximum. In this context, the amplitude of the juddering vibration is related in particular to the pure vibrating movement.

A further exemplary parameter is the frequency $f_{Grabbing}$ of the juddering vibration or $\omega_{Grabbing}$, the following equation being applicable:

$$\omega_{Grabbing} = 2 * \pi * f_{Grabbing}$$

Another exemplary parameter, which may be used in a preferred embodiment for the calculation of the deviation by itself or in connection with other parameters, is the overall (average) slope of the angular velocity of the transmission input shaft (B). This slope (B) is in particular the slope of the angular speed that is ordinarily present independent of (superimposed) vibrations. For example, this may be the slope of an increase of the angular speed of the transmission input speed, which is independent of the juddering or likewise would be present if there were no juddering present.

An additional exemplary parameter that may be taken into account in the determination of the deviation is the angle between two teeth of a travel sensor $(\phi_{Pulse})$. However, such an angle $\phi_{Pulse}$ is only present if an appropriate travel sensor is used. Such an exemplary travel sensor in particular has spaced teeth between which there are intermediate spaces.

The angle between two teeth in this context is in particular the angle that is present between two bordering surfaces of adjacent teeth that are laid out in the rotary direction or in the opposing rotary direction.

Especially preferred according to the invention is the deviation or the deviation of the timing position of the local extremum calculated in a first step is calculated from the actual or approximate position of the local extremum on the basis of the following equation:

$$\Delta t = t_{Peak} - t_{max} \approx T_{int} - 0.5*(\text{Median} - t_{max})*[-3*\omega_{max}/(A*\omega_{Grabbing}^2 * T_{int}^2 + 5/4] - B/(A*\omega_{Grabbing}^2) - \varphi_{Pulse}/(2*\omega_{max})$$

Preferably, a rough assumption is made that $d^2\omega/dt$ essentially corresponds to $\omega_{Grabbing}$.

In a preferred embodiment, a deviation is calculated and, by means of this calculated deviation, the phase angle of an actual extremum, especially an actual maximum, is calculated or approximated to the angular speed or rotary speed of the transmission input speed. The actual phase of the angular speed or rotary speed of the transmission input shaft of a vibration that is attributable to juddering, is calculated or approximated.

The determination of the phase is preferably carried out on the basis of extrema, especially on the basis of maxima. Therefore, the calculation of the phase angle, for example, may be carried out on the basis of a timing position of a maximum.

In a preferred embodiment, it is provided that a phase angle is calculated in a first step. This may in particular be the phase angle of the angular speed of the transmission input speed. According to this preferred embodiment of the invention, this calculated phase angle is first used for the modulation of a reference clutch control travel. This means in particular that the phase angle of the modulated reference clutch control travel is selected in this way, like the phase angle of the transmission input speed that was calculated in the first step.

In a preferred embodiment, a correction of the phase angle of the angular speed of the transmission input speed or transmission input shaft that was calculated in a first step is carried out. It should be noted that the angular speed or phase angle of the transmission input speed or transmission input shaft is in particular related to the value detected or calculated according to magnitude. These data are related in particular to the time-travel curve of the transmission input speed or angular speed. This means that the time characteristic of the magnitude of these signals in particular is considered in the determination of the phase angle and less the question of which rotary angle the shaft has in relation to its axis.

In a preferred embodiment, it is provided that a deviation is calculated in a second step that is present between the phase angle determined in the first step and the actual phase angle or vice-versa. Preferably, it is provided that on the basis of this deviation and/or the one calculated in the second step, the actual phase angle of the transmission input speed or angular speed of the transmission input shaft is used for modulation of the reference clutch control travel. In a preferred embodiment, it is provided that this deviation is used in such a manner that the phase angle and/or the period of the reference clutch control travel is changed.

Especially preferred, the period of the reference clutch control travel changes by the amount of the detected deviation. This may in particular be such that this change is carried out within a period or that the period of the modulated reference clutch control travel is changed one time by the amount of the detected deviation in order then to essentially achieve an agreement between the actual phase angle of the speed or angular velocity of the transmission input shaft and the modulated reference clutch control travel.

It may also be provided that, for example, the period of the modulated reference clutch control travel is changed step-by-step over several periods in such a manner that after several periods there is an agreement with respect to the phase angle.

It is also preferable that the reference clutch control travel and/or the torque transmissible by the clutch device be modulated as a function of the calculated local extremum, especially the local maximum, and/or a calculated deviation, in order to counteract juddering vibrations. It is especially preferable that the amplitude of the reference clutch control travel is adjusted or changed in values approximated or adapted to actual amplitudes.

The objective is also achieved via a method whereby a determination is made of whether juddering vibrations are present in a motor vehicle drive train, and whereby detected juddering vibrations are counteracted by a change of the position of a device, whereby a rotary parameter of a drive train component may be changed by changing the position of this device, and whereby this position change is carried out according to a predetermined function, especially a time function, that has a ramp function.

According to the invention, it is provided in particular that a determination is made of whether juddering vibrations are present in a motor vehicle drive train. If juddering vibrations are detected, these juddering vibrations are counteracted by a change of the position of a device. One such device is a rotary parameter of a drive train component, directly or indirectly changeable or influenceable via its position change. It should be noted that such a position change may or may not directly counteract the juddering vibrations. It may also be provided that the device is changed and then a check is made of whether the juddering vibrations have changed or were eliminated.

The device whose change of position is to counteract the juddering vibrations may in particular be a clutch device that is disposed in the drive train of a motor vehicle. One such clutch device may in particular be a starting clutch.

According to the invention, there is provided in particular a position change of the device—or in the preferred embodiment of the clutch device—is specified or prescribed depending on a predetermined function. This function has a ramp function. The function is in particular a timing function.

The objective is achieved in particular via a method whereby a determination is made of whether there are juddering vibrations in a motor vehicle drive train, and whereby juddering vibrations are counteracted by a change in the position of a device, whereby a rotary parameter of a drive train component is changeable via a change in the position of this device, and whereby the juddering vibrations are counteracted by the change in the position of the device in first time segments and the change in the position of the device is interrupted in second time segments, so that the system may vibrate freely in these two time segments.

According to the invention, it is provided in particular that juddering vibrations that are present in the area of a drive train of a motor vehicle are counteracted in first time segments via a change in the position of a device, and in second time segments the change of the position of this device is interrupted so that the system may vibrate freely in these two time segments.

However, it should be noted that in these second time segments, possibly for other reasons that are independent of a counteraction of the juddering vibrations, the position of the device is changed.

The device is preferably a clutch device, the position of this clutch device especially preferably being changed in such a manner that the torque transmitted by the clutch device is changed, in particular modulated. It may also be provided that the clutch control travel of this clutch device is changed or modulated.

Such a modulation may, for example, be designed in a vibrational manner and in particular sinusoidally. Other possibilities are also preferred.

In the first time segments the change is preferably made in such a manner that at least an attempt is made to counteract these juddering vibrations. This means in particular that at least measures are introduced that—in some cases in conjunction with other measures that could have applicability—counteract the juddering vibrations. Especially preferred are juddering vibrations counteracted in a targeted manner, so that it can be said with a certain probability or with certainty that the juddering vibrations are reduced or gradually eliminated.

In a preferred embodiment, the ramp function has a section in which the ramp is driven up from a starting value to a value and a section set later in time in which the ramp is driven back down from this value to a final value. It may be provided that the ramp is immediately driven back down from the value. Moreover, it is preferable that the ramp, in the meantime, be held to this value before it is driven back down from this value.

This value may, for example be equal to "one". It may also be another value.

The starting value and the final value are preferably each equal to "zero". These values, however, may also be different or have another equal value.

In a preferred embodiment, the modulated clutch control travel is determined as a function of an adjustment factor. This may, for example, be an adjustment constant.

The adjustment factor or the adjustment constant may in particular be a constant that determines the counteraction of a controller.

Preferably, a self-excited juddering in particular is compensated.

Furthermore, it is preferable that a self-excited juddering is compensated via a sinusoidal modulation of the reference clutch control travel that is prescribed in a controller interrupt.

It may be provided, for example, that the phase and period of such modulation is defined from found maxima of the transmission input speed or the juddering vibration.

Moreover, it may be provided, for example, that the amplitude is prescribed in a manner proportional to the judder amplitude of the transmission input speed. Such an amplitude may, for example, be defined from the comparison between a filtered and an unfiltered transmission input speed. However, the filtered transmission speed is in particular the vibrating portion of the transmission input speed juddering vibration is present.

Preferably, the clutch control travel is modulated for the reduction or elimination of juddering vibrations and this modulated clutch control travel is determined as a function of an amplitude of the juddering vibration. This may in particular be an amplitude of the juddering vibration that was found as the last one. It should be noted that the clutch control travel may in particular be the reference clutch control travel.

The modulated clutch control travel may be determined, for example, as a function of a sinusoidal function. Such a sinusoidal function may basically be of any type. Especially preferably, it is provided that such a sine function is a function of the frequency of the judder and/or of the time and/or of a calculated phase shift between the juddering vibration and the characteristic of the travel modulation, especially the characteristic of the actual travel modulation.

Modulated clutch control travel may be determined as a function of an amplitude of the juddering vibration and/or as a function of a sine function, the amplitude being updated at the zero crossing of the sine function. Such an updating may in particular be carried out as a function of and in consideration of the transmission input speed. Therefore, in particular, the sine function is a function of the transmission input speed or the juddering frequency.

Preferably, a change of position of a device, in particular the change of a clutch device, or a clutch control travel modulation, or a modulation of the torque transmissible by the clutch is carried out in first time segments and in second time segments. Such a change or modulation is excluded. It should be noted this change or modulation is in particular one that is carried out in order to counteract juddering vibrations. Therefore, this means basically that the torque transmissible by the clutch on the basis of other control operations, or the like, in some cases may be changed in second time segments. Preferably, the first and second time segments alternate if it is established that juddering vibrations are present. Also, alternation between clutch control travel modulation in first time segments and a stopped clutch control travel modulation in second time segments are carried out until it is established that the amplitude of the judder vibrations is smaller than a prescribed shutoff threshold. This shutoff threshold may also be "zero".

In a preferred embodiment, the duration of the first time segments is within the range from one to five judder periods. However, the first time segments may also have another duration. In an especially preferred embodiment, it is provided that the first time period has a duration of two to three judder periods.

However, the duration of the first time segments may also be different.

The invention also contemplates a clutch control travel modulation with a constant phase carried out inside the first time segment. The phase is related in particular in this case to the phase shift that is present between the clutch control travel modulation and the juddering vibration.

In a preferred embodiment, the phase or phase shift during which the system vibrates freely is determined anew, and the modulation is then carried out repeatedly in a first time segment with a new phase $\phi_{current}$ or a new phase shift.

In this context, the modulated clutch control travel is a function of the phase or phase shift.

In a preferred embodiment, the ramp is formed with a trapezoidal shape.

However, the ramp may also be formed differently. In particular, the ramp run-up and the ramp run-down may have a non-linear region. Also, between the running up and running down, there may be a non-linear region of the ramp.

In a preferred embodiment, especially in first time segments, the clutch control travel modulation is determined as follows:

$$Weg_{mod} = (Ramp\_up, 1, Ramp\_down) * K_{control\ setting} * A_{current} * \sin(\omega Grabbing * t + \phi_{current}),$$

whereby $Weg_{mod}$ is the modulated clutch control travel, "(Ramp up, 1, Ramp down)" is an exemplary ramp function, $k_{control\ setting}$ is an adjustment constant, $A_{current}$ is the amplitude of the juddering vibration used at a given instant or the difference between the unfiltered transmission input speed and the filtered transmission input speed, whereby this relates in particular to the observed or detected transmission input speeds, $\omega_{grabbing}$ which is $2*\pi$ times the juddering frequency; t is the time and $\phi_{current}$ is the phase shift used at a given instant between the clutch control travel modulation for the determination of the torque modulation and the juddering vibration.

Furthermore, the objective of the invention is achieved in particular via a method, whereby a determination is made of whether juddering vibrations are present in a motor vehicle drive train, and whereby a clutch device is disposed in this drive train that can be operated in a slip mode, and whereby detected juddering vibrations are counteracted via a modulation of the torque transmissible by the clutch device and/or of the clutch control travel, and whereby this modulation is such that there is control of a modulated reference clutch torque, which is the difference between the unmodulated clutch torque and a product. Furthermore, this product has a first factor that is a function of the angular speed of a clutch plate, and/or the angular speed of a transmission input shaft, and/or the angular speed of a wheel of the motor vehicle, and/or a ratio that is assigned to a gear which is shifted in a transmission device disposed in a drive train. Furthermore, this adjustment constant is a function of parameters of the vibrating drive train system and/or of parameters that describe or at least assist in describing the friction characteristic of the clutch device.

According to the invention, there is a calculation or detection of whether juddering vibrations are present in a motor vehicle drive train. In this motor vehicle drive train, a clutch device, such as a starting clutch may be operated in a slip mode. If juddering vibrations are calculated or detected, they are counteracted via a modulation of the torque transmitted by the clutch device and/or of the clutch control travel. This modulation may in particular be such that a modulated reference clutch torque is controlled or a modulated reference clutch torque is superimposed on a controlled reference clutch torque. This modulation of the reference clutch torque is preferably specified as the difference between an unmodulated clutch torque and a product. This product is preferably such that it has a first factor, which is a function of the angular speed, and/or rotary speed of a clutch plate of the clutch device, and/or is a function of the angular speed or rotary speed of a transmission input shaft, and/or is a function of angular speed and/or rotary speed of a wheel of the motor vehicle and/or is function of a shifted ratio of a clutch device disposed within the drive train. Preferably, this product has a second factor that is an adjustment constant. The adjustment constant in this embodiment is preferably a function of parameters of the vibrating drive train system and/or of parameters that describe, or at least assist in describing, the clutch device.

In a preferred embodiment, the modulated clutch torque is calculated on the basis of the following equation:

$$M_{Mod}=M-k*(\omega_{Clutch\ Disk}/i_{Gear}-\omega_{Wheel}),$$

whereby $M_{Mod}$ is the modulated clutch torque, M is the unmodulated clutch torque, k is an adjustment constant, $\omega_{Clutch\ Disk}$ is the angular speed of the clutch plate, $i_{Gear}$ is a ratio assigned to the shifted gear and $\omega_{Wheel}$ is the angular speed of a wheel of the motor vehicle.

An equation that describes, or at least assists in describing, the friction characteristic of the clutch device or parameters corresponding to parameters may be, for example, as follows: A function is provided that describes how the coefficient of friction of the clutch device changes via the slip of the clutch device. The adjustment constant may also, for example, be a function of the time derivative of such an equation, or such a function.

Furthermore, the objective of the invention is achieved via a method, whereby a determination is made of whether juddering vibrations are present in a motor vehicle drive train, and whereby a clutch device is disposed in this drive train that can be operated in a slip mode, wherein juddering vibrations are counteracted via a modulation of the torque transmissible by the clutch device and/or of the clutch control travel, and whereby this modulation is such that a modulated reference clutch control torque is controlled that is specified as the difference between the unmodulated clutch torque and a product. Furthermore, this product has a first factor which is a function of the angular speed of a clutch plate, and/or the angular speed of a transmission input shaft, and/or the angular speed of a wheel of the motor vehicle, and/or a ratio that is assigned to a gear that is shifted in a transmission device disposed in a drive train. In addition, this adjustment constant is a function of the reference clutch torque and/or a nominal clutch torque, which is calculated assuming a nominal coefficient of friction and/or of a function of an average slip.

According to the invention, the adjustment constant is a function of a nominal clutch torque, which is calculated assuming a nominal coefficient of friction. The adjustment constant is dependent on a function of the average slip of the clutch device, and in particular, the average slip that occurs during a clutch modulation.

In a preferred embodiment, for a given decrement, the overall judder-related damping of the system during the modulation of the clutch torque or clutch control travel modulation is selected as a function of the adjustment constant in such a manner that this decrement corresponds to half the product of the total damping of the ($\alpha_{Total}$) system and the judder period (T). In this context, the decrement corresponds to the logarithm of the quotients of two successive amplitudes of the juddering vibration. These successive amplitudes in particular were detected, and in particular on the basis of the characteristic of the transmission input speed. These amplitudes may be actual amplitudes and/or such that are calculated in a first step. There may also be amplitudes of the juddering vibration calculated according to another characteristic that follows each other in succession in the sense of this other characteristic.

This relationship may be expressed as: $d=\ln(A_{i+1}/A_i)$, wherein d is the decrement, $A_i$ is an amplitude of the juddering vibration and $A_i+1$ is an amplitude of the juddering vibration that follows amplitude $A_i$.

Preferably, the system is such that the following equation is produced for the overall damping of the system during torque modulation.

$$\alpha_{Total}=\alpha+[M_{nom\_0}*i*f(S)+k*f'(S)]/[f_{nom}*i*j_{KS}],$$

whereby $\alpha_{total}$ is the total damping of the system when there is torque or clutch control travel modulation; $\alpha$ is a factor; $M_{nom\_0}$ is clutch torque calculated from the nominal coefficient of friction $f_{nom}$, especially while starting off; i is the ratio between the clutch plate and the driven wheel that is present for the gear shifted in the transmission device; f(S) is a function that indicates how the friction value changes via the slip; f'(S) is the time derivative of function f(S); k is an adjustment constant; $f_{nom}$ is the nominal coefficient of friction of the clutch device, which is assumed in the ideal case to be a constant, a coefficient of friction present when the clutch device is engaged; and $J_{KS}$ is the moment of inertia of the clutch plate.

For the factor α, the following equation is preferably applicable:

$$\alpha = b*[1/(i^2*J_{KS})+(1/J_{Fzg})],$$

b being the damping of the system and $J_{Fzg}$ being the moment of inertia of the motor vehicle.

In an especially preferred embodiment, the following equation is applicable for the factor or the adjustment constant k:

$$k=[(2*d/T-\alpha)*f_{nom}*J_{KS}\_M_{nom}\_0*f'(S)]/f(s)$$

Furthermore, it is preferred that the adjustment constant k is a function of the period T of the juddering vibration and/or of the moment of inertia of a clutch plate and/or of the transmission input.

According to a preferred embodiment the adjustment constant is a function of a nominal friction value of the clutch device.

The adjustment constant may depend in a preferred design on a quotient of two amplitudes of the juddering vibration that follow one after the other in time sequence. These may be amplitudes that are detectable; ones that were detected, or ones that were calculated according to a predetermined characteristic. The adjustment constant k is a function of the logarithm of two such time amplitudes of the juddering vibration that follow one after the other in time sequence.

In an especially preferred design, a ramp given as a factor within a period of the juddering vibration is built up from a starting value to a value or a target value. Especially preferred, the time period of this build up corresponds to approximately one period of the juddering vibration. It may also take approximately one period of the juddering vibration until the adjustment factor k reaches its targeted value.

Furthermore, the objective of the invention is achieved via a method, whereby a determination is made of whether juddering vibrations are present in a motor vehicle drive train, and whereby a clutch device is disposed within this drive train that is operable in a slip mode, and whereby juddering vibrations are counteracted via a modulation of the torque transmissible by the clutch device and/or the clutch control travel, and whereby this modulation is such that the modulation is carried out in different sections according to a different characteristic.

According to the invention, there is a calculation of whether juddering vibrations are present or a detection that they are present in a motor vehicle drive train. Disposed in this motor vehicle drive train is a clutch device, such as a starting clutch, which may be operated in a slip mode or shifted into a slip mode. If it is detected or calculated that juddering vibrations are present, the torque transmissible by the clutch device and/or the clutch control travel is modulated, so that the juddering vibrations are counteracted. However, this does not mean that a corresponding modulation must permanently be carried out during juddering vibrations.

The modulation according to this embodiment is such that it is carried out in different sections according to a different characteristic.

Furthermore, the objective of the invention can be achieved via a method, whereby a determination is made of whether juddering vibrations are present in a motor vehicle drive train. A clutch device is disposed within this drive train that is operable in a slip mode. Detected juddering vibrations are counteracted via a modulation of the torque transmissible by the clutch device and/or of the clutch control travel. This modulation is such that it is designed in a vibratory manner and has a first half wave 68, 82 and in a given case a second half wave 70, 84, whereby the amplitude 66, 86 of the first half wave is greater than the amplitude 88 of the second half wave 70, 84.

According to the invention, the modulation of the torque transmissible by the clutch device or of the clutch control travel is configured in a vibratory manner, and has a first half wave, as well as in a given case a second half wave. The vibratory-type embodiment according to the invention may basically be of any type. Especially preferred is a sinusoidal-vibration-type of design. According to the invention, a partial vibration that is present during a vibration period has a first half wave, as well as in the given case, a second half wave. In this context, it is provided that the amplitude of the first half-wave is larger than the amplitude of the second half wave, which in the given case may be equal to "zero".

In a preferred embodiment, the modulation is interrupted or terminated following the second half wave, thus after the vibration has run through essentially or exactly one period. However, other divergent values for an interruption or termination of this type may be provided.

Preferably, after the interruption, termination of the modulation, or of the second half wave, the phase of the juddering vibration is calculated. For this purpose, it may be provided in particular that this calculation of the phase is carried out on the basis of a local extremum, such as a local maximum of the juddering vibration, or the transmission input speed.

It may also be provided that the amplitude of the second half wave equals "zero" or the second half wave is not present at all.

In an especially preferred embodiment, the juddering vibration is counteracted by exactly one half wave or by a modulation having a half wave, the modulation then being interrupted or terminated.

In a preferred embodiment, the modulation of the clutch control travel or of the torque transmissible by the clutch is started with a phase shift in relation to the juddering vibration.

In particular, the modulation is started if a local extremum, such as a local maximum or local minimum of the juddering vibration is detected. Preferably, the modulation is then started immediately.

Preferably, the modulation is designed in such a manner that at the beginning and/or at the end of the modulation of the time characteristic, the modulation is such that a tangent runs essentially parallel to the time axis at this running starting or end region. This relates to the beginning and the end of a half wave.

However, a curve, especially a tangential one, is not present.

Furthermore, the objective of the invention is achieved via a method, whereby a determination is made of whether juddering vibrations are present in a motor vehicle drive train. A clutch device is disposed within this drive train that is operable in a slip mode. Detected juddering vibrations are counteracted via a modulation of the torque transmissible by the clutch device and/or the clutch control travel. This modulation is such that it is determined as a function of the juddering vibration, and/or the parameters describing the juddering vibration, and/or a function describing the juddering vibration, and as a function of prescribed boundary conditions.

According to the invention, there is a calculation, and/or a detection of whether juddering vibrations are present in a motor vehicle drive train. At least one clutch device, namely the starting clutch which may be operated in slip mode, is disposed in this motor vehicle drive train. Furthermore, according to the invention, calculated or detected juddering vibrations are counteracted by a modulation of the torque transmissible via the clutch device or the clutch control travel. In this context, this modulation may be such that it or the time characteristic of this modulation is specified as a function of the juddering vibration, and/or as a function of parameters that describe the juddering vibration, and/or according to a function that describes, or at least assists in describing the juddering vibration, and as a function of predetermined boundary conditions.

In a preferred embodiment, juddering vibration is described as a function of the torsion angle of a predetermined drive train section.

The course of the modulation is prescribed as a function of variables, and these variables are prescribed, at least partially on the basis of the boundary conditions.

An exemplary boundary condition may, for example, be such that it is assumed that the torsion angle at the instant "zero" corresponds to the difference $\phi_0$, which would be present in a given load scenario while disregarding the juddering vibration, and the angular amplitude $A_\phi$ corresponds to the juddering vibration.

A boundary condition may also be such that the time derivative of the torsion angle at the instant "zero" is also="zero".

Another alternative or supplementary boundary condition may be such that the torsion angle $\phi(T/2)$ at the instant of the half period (T/2) of the juddering vibration corresponds to the rotary angle $\phi_0$ that would be present in a given load scenario while disregarding the juddering vibration.

There may also be other boundary conditions.

As a supplement or an alternative, a boundary condition may be provided such that the time derivative of the torsion angle is equal to "zero" at the instant of the half period of the juddering vibration. In a preferred embodiment, the period of the modulation of the torque transmissible by the clutch device and/or of the clutch control travel corresponds to the half period of the juddering vibration.

Preferably, the torque transmissible by the clutch device and/or the clutch control travel is modulated according to or depending on a function that has the following form:

$$a*\sin(\omega*t),$$

a being a factor. In a preferred embodiment, this factor is determined on the basis of prescribed boundary conditions that may be such as were already mentioned within the context of this publication.

Preferably, the following equation is applicable for the factor a, especially taking into account the boundary conditions:

$$a=2*\omega^2 A_\phi/\pi,$$

$A_\phi$ being the amplitude of the torsion angle as compared to the rotary angle $\phi_0$ that is or would be present if there were no juddering vibrations.

Preferably, the method of the invention is carried out in slip mode of a clutch device of a motor vehicle.

The objective of the invention is further achieved via an electronic controller that has a memorizing device, and at least one device for outputting and/or receiving signals, whereby a data processing program is stored in the memorizing device of this electronic controller. This data processing program is able to control a method according to one of the preceding methods.

The electronic control device has a memorizing device and a device for outputting and/or receiving signals. This device may, for example, be a terminal for a wire connection or a wireless connection or the like. The electronic control device also has a memorizing device or is connected to a memorizing device. Stored in this memorizing device is a data processing program that can carry out a method according to the present publication.

For purposes of the present invention, the meaning of the term "control" is intended to mean "regulating" and/or "controlling", as used by the German Standardization Institute (DIN). The same applies for terms derived from the term "control".

BRIEF DESCRIPTION OF THE DRAWINGS

In the following, several exemplary or preferred aspects of the embodiments according to the invention will explained with reference to the Figures; the invention is not to be limited hereby.

Shown are.

DETAILED DESCRIPTION OF THE INVENTION

Figure 1:
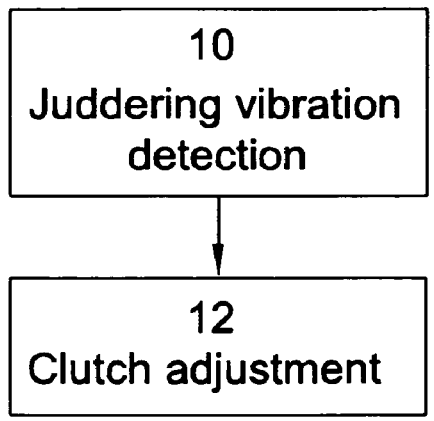
FIG. 1 is a diagrammatic illustration of the steps of an exemplary method according to the invention.

FIG. 1 is an exemplary method in diagrammatic illustration.

In step 10, a determination is made whether juddering vibrations are present, or their presence has been detected.

If juddering vibrations of this type are present, a device is adjusted in step 12 in order to counteract these juddering vibrations. This device is in particular a clutch device of a motor vehicle, such as a drive clutch. The counteraction may, for example, be such that, in the case that the device is a starting clutch of a motor vehicle, the clutch control travel or the torque transmissible by the clutch device is modulated. Such a modulation may in particular be in the form of vibration. It may also be provided, for example, that the modulation is sinusoidally formed.

Figure 2:
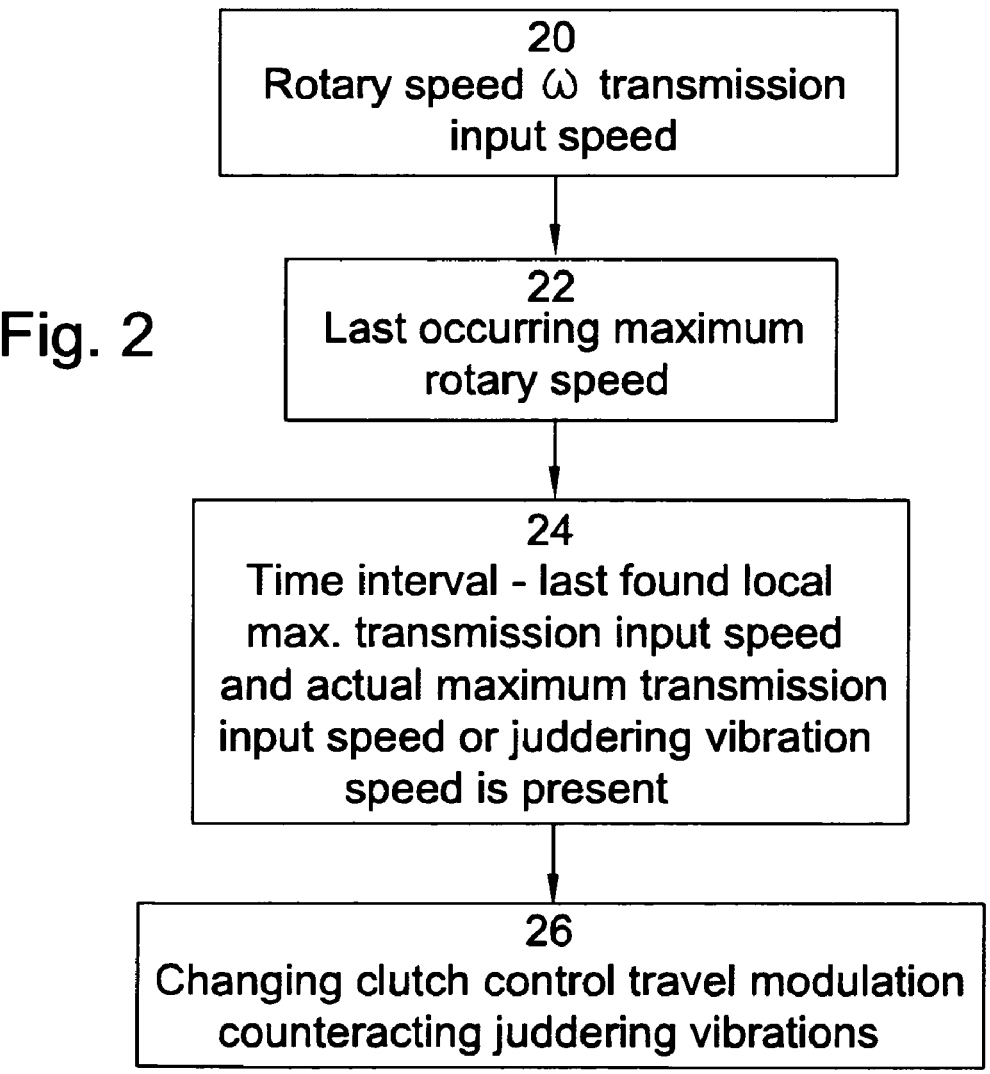
FIG. 2 is a diagrammatic illustration of the steps of an exemplary method according to the invention.

FIG. 2 shows the steps of an exemplary method according to the invention in diagrammatic illustration.

In step 20, a value is determined for rotary speed ω of the transmission input speed in different evaluation interrupts, and a specific instant is assigned thereto.

In step 22, a last occurring maximum of these rotary speed values ω of the transmission input speed is determined.

It may be provided that based on this maximum or its timing position, the phase of a modulated clutch torque or a modulated clutch control travel is determined and the reference clutch torque or the reference clutch control travel is modulated accordingly.

In step 24 a determination is made of whether the time interval between the last found local maximum of the transmission input speed and an actual maximum of the transmission input speed or the juddering vibration speed is present. This may in particular be such that the time interval between the last found local maximum of the transmission input speed and a local maximum of the actual clutch control travel or the actual clutch torque is determined. Other possibilities of determining this deviation may also be used.

In step 26, the clutch control travel modulation that is carried out in order to counteract juddering vibrations in the drive train is changed. For this purpose, a period of the modulated travel allowance is set in such a manner that it corresponds to the old period, which is reduced by the deviation determined in step 24. This new period is used as a period for a vibration run. Next, the old period is used again for the clutch control travel modulation.

Based on FIGS. 3 and 4, the steps of an exemplary method according to the invention will be explained.

Figure 3:
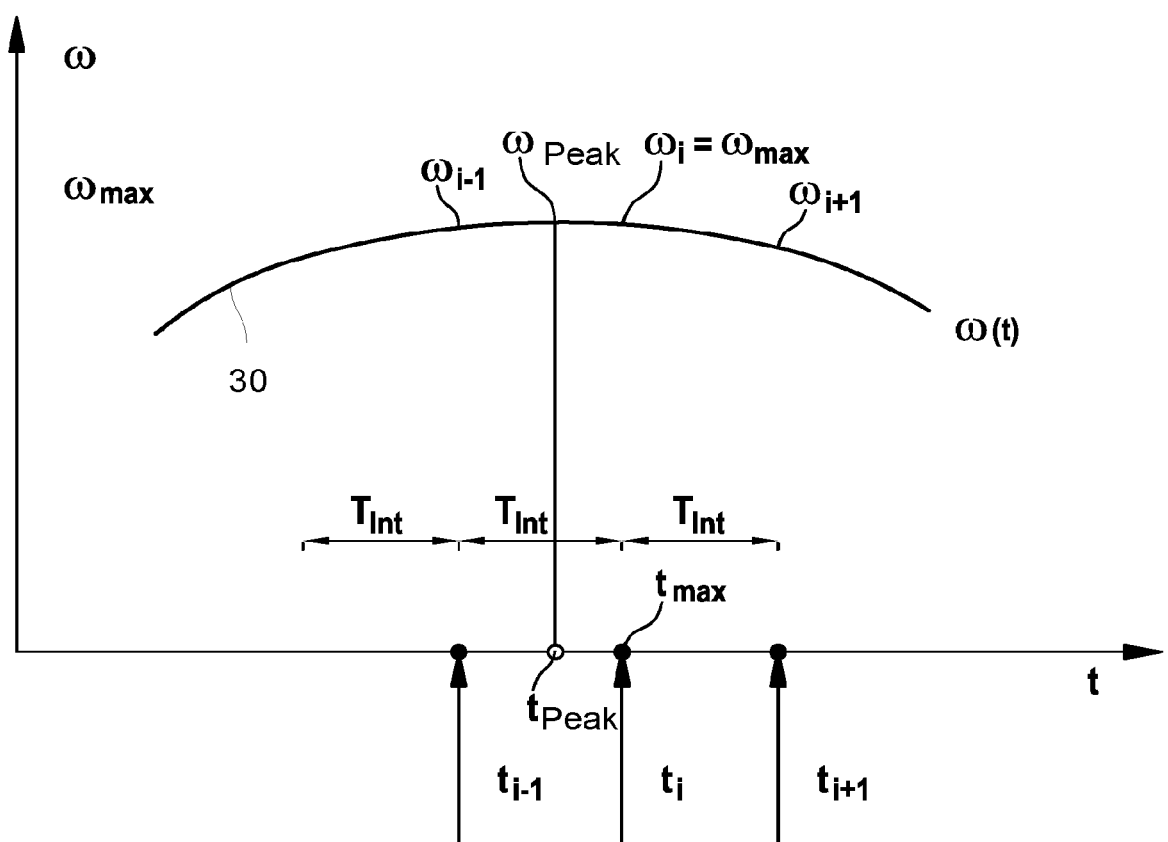
FIG. 3 illustrates an exemplary time characteristic of the rotary speed of a transmission input shaft shown in sections.
Figure 4:
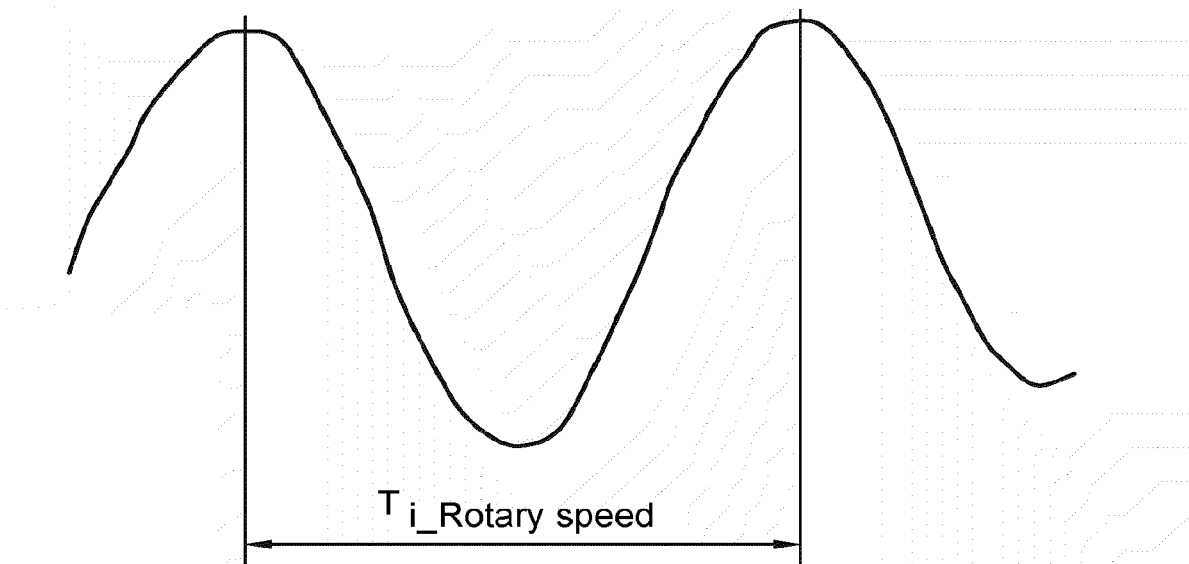
FIG. 4 illustrates segmented exemplary time characteristics of the rotary speed of a transmission input shaft and an actual modulated clutch control travel.
Figure 4:
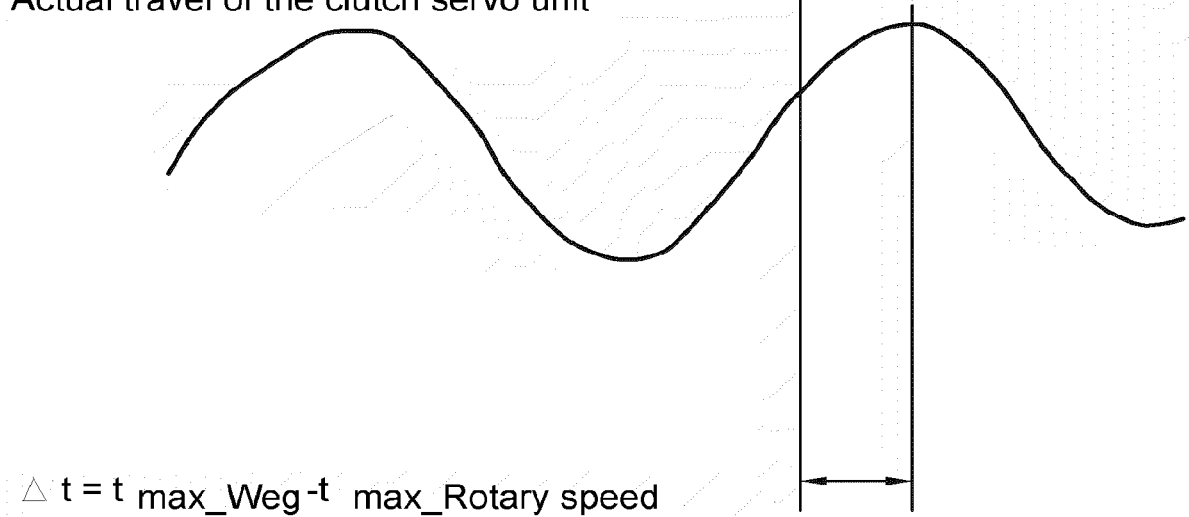

In FIG. 3, an exemplary, actual time characteristic of a vibrating transmission input speed or rotary or angular speed ω(t) over time is shown (reference character 30).

In a plurality (in this case three) of successive time interrupts $T_{Int}$, the rotary speed ω(t) is evaluated each time. The rotary speed values determined in this way, $\omega_{i-1}$, $\omega_i = \omega_{Max}$ and $\omega_{i+1}$, are determined in these particular time intervals $T_{Int}$ and assigned to the particular time values $t_{i-1}$, $t_i = t_{max}$ and $t_{i+1}$.

Then, the local maximum of these—in this case three—rotary speed values is calculated. From the comparison of the values $\omega_{i-1}$, $\omega_i$ and $\omega_{i+1}$, it is evident in FIG. 3 that the maximum of these three values is at $\omega_i = \omega_{max}$.

Next, the reference clutch torque or the reference allowance for the clutch control travel is modulated, the phase of this modulation being determined as a function of the phase of the rotary speed of the transmission input shaft. In this case, an orientation to the local maximum $\omega_i = \omega_{Max}$ occurs, so that a corresponding local extremum, especially a local maximum, of the clutch control travel is set at the appropriate place.

As already indicated in FIG. 3, the actual local maximum of the rotary speed of the transmission input shaft, however, is not present at instant $t_i$, but rather, at instant $t_{Peak}$. Accordingly, the actual local maximum of the rotary speed of the transmission input shaft is not $\omega_i$, but $\omega_{Peak}$.

Consequently, an actual deviation between the phase of the rotary speed of the transmission input shaft and the phase of the modulated clutch control travel is present. These relationships are clarified in FIG. 4.

There, in the top half, the vibrating portion of the transmission input speed, and in the bottom half, the vibrating, modulated portion of the actual travel of the clutch servo unit are illustrated whose vibration is required by a modulation of the reference clutch control travel or of the reference clutch torque.

In a second step, the timing deviation between the position of the local maximum of the transmission input speed or rotary speed of the transmission input shaft determined in the first step, and the actual position of this maximum of the transmission input speed is determined.

This deviation essentially corresponds to the deviation that is calculated between the local maximum of the actual travel and the actual local maximum of the transmission input speed.

To this end, different influences that place conditions on the deviation are taken into account.

Then, the period of the modulated clutch control travel changes for a period by the deviation Δt in order to achieve a phase alignment.

Figure 5:
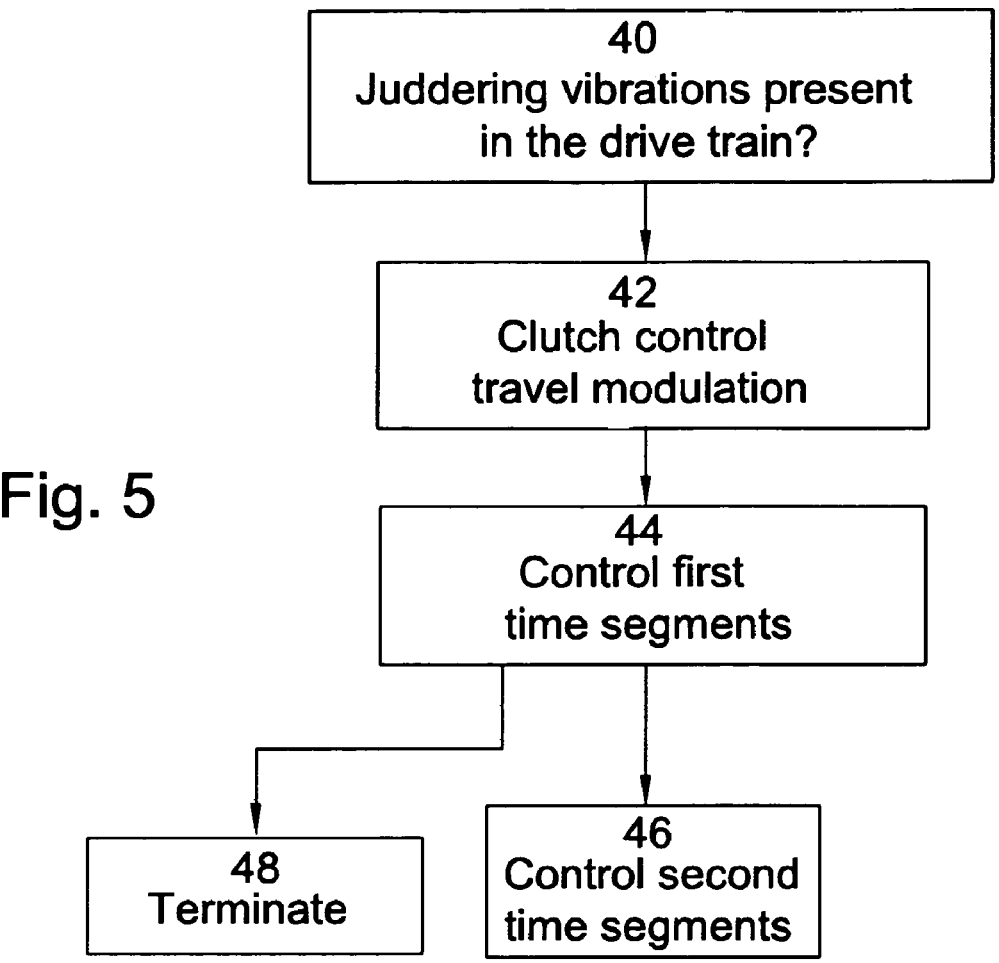
FIG. 5 is a diagrammatic illustration of the steps of an exemplary method according to the invention.

FIG. 5 shows the steps of an exemplary method according to the invention in diagrammatic illustration. In step 40, a calculation and/or determination is made of whether juddering vibrations are present in the drive train of a motor vehicle.

In step 42, a clutch control travel modulation is started by which the juddering vibrations are to be counteracted.

The modulation started in step 42 is such that a control thereafter alternates according to first and second time segments.

The control in first time segments is indicated by step 44 and the control according to second time segments is indicated by step 46.

In the first time segments, the clutch control travel is modulated according to the following equation:

$$Weg_{mod} = (Ramp\_up, 1, Ramp\_down) * K_{control\ setting} * A_{current} * sin(\omega_{grabbing} * y + \phi_{current}),$$

The clutch control travel modulation is carried out as a function of a ramp function. In this example, this is (Ramp_up, 1, Ramp_down).

Furthermore, it is provided that this ramp is run up at the beginning of the first time segment and is run back down at the end of the first time segment.

Furthermore, in step 44 it is provided that the amplitude $A_{current}$ is updated during the sine zero crossing based on the measured transmission input speed.

Within the first time segment, the phase $\phi_{current}$ remains constant.

The first time segment may have, for example, a duration of 2-3 judder periods.

After the updating, a check is made of whether this judder amplitude $A_{current}$ is smaller than a predetermined shutoff threshold.

If this is the case, the method in step 48 is terminated. If this is not the case, the method is continued in step 46 after step 44 is terminated.

In step 46, the modulation of the clutch control travel is interrupted so that the system may freely vibrate for a specified time. This is in particular a time that is needed and/or used to determine the phase of the vibrations. Therefore, a new phase $\phi_{current}$ is specified.

The method is then continued in step 44 as a function of this newly determined phase $\phi_{current}$.

Figure 6:
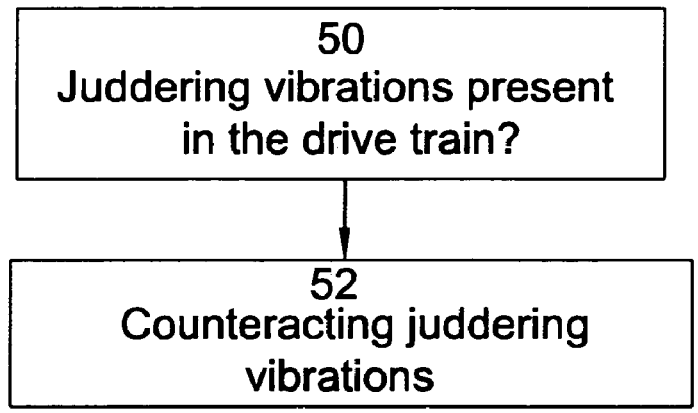
FIG. 6 is a diagrammatic illustration of the steps of an exemplary method according to the invention.

FIG. 6 shows the steps of an exemplary method according to the invention in diagrammatic illustration.

In step 50, a determination is made of whether juddering vibrations are present in a drive train, or it is detected that juddering vibrations are present in the drive train of a motor vehicle.

In step 42, a start is made in counteracting these juddering vibrations, and in particular via a modulation of the torque transmitted by the clutch or according to the following equation.

$$M_{Mod}=M-k*(\omega_{Clutch\ Disk}/i_{Gear}-\omega_{Wheel})$$

In this context, the factor k is selected according to the following equation:

$$k=[(2*d/T-\alpha)*f_{nom}*J_{KS}-M_{nom\_0}*f'(S)]/f(S)$$

In this context, it is provided that this factor k at the beginning builds up in ramp form to its target value. In this context, this ramp is such that the target value of the factor k is reached after approximately one period of judder vibration.

Figure 7:
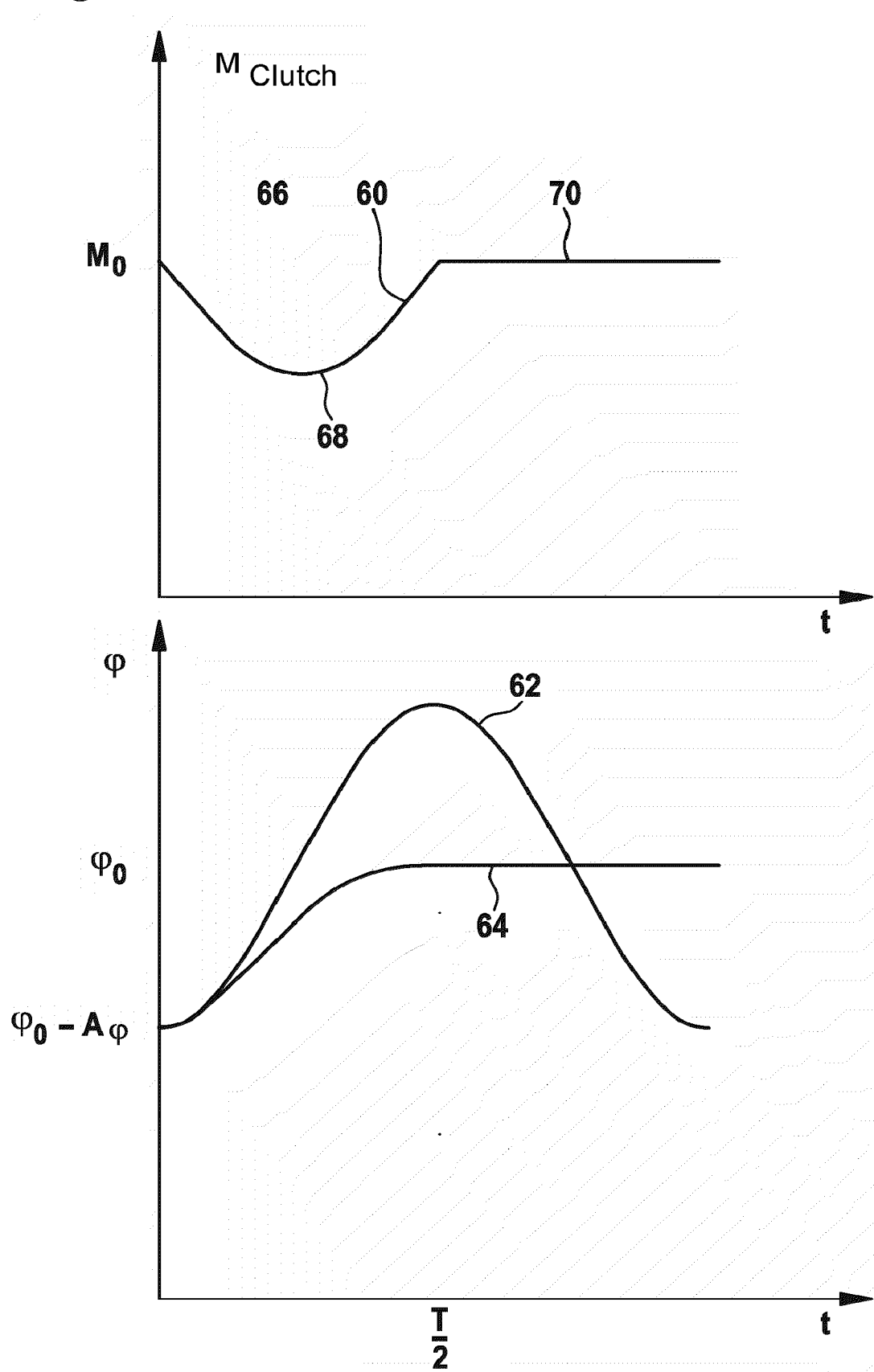
FIG. 7 illustrates characteristics of a torque transmissible by a clutch device over time and of the torsion angle of a drive train section over time.

In the top half of FIG. 7, a modulated torque 60 that is transmissible by a clutch device is depicted. The torsion angle of a predetermined drive train section 62 that is present if no torque modulation is carried out at a prescribed juddering vibration is depicted in the bottom half of FIG. 7. Furthermore, 64 of the torsion angle, which is adjusted if the torque transmissible by the clutch is modulated according to 60, is depicted in the bottom half of FIG. 7.

From 62, it is obvious that in this exemplary case, the juddering vibration has an essentially sinusoidal characteristic.

The modulation of the torque transmissible by the clutch device or of the clutch control travel is carried out in such a manner that amplitude 66 of a first half wave 68 is larger then the amplitude of a second half wave or a wave 70 that is not present.

It may be provided that the characteristic of half wave 68 is prescribed in such a manner that, after the cycle of half wave 68 or of a corresponding clutch control travel and/or torque modulation, the juddering vibration is essentially eliminated.

To this end, appropriate limit conditions may be provided on the basis of which the characteristic of the clutch torque modulation or half wave 68 is determined.

In curves 62 and 64, as already mentioned, the torsion angle of a drive train section is depicted over time.

The torsion angle $\omega_0$ essentially corresponds to the torsion angle that would be present if no juddering vibration were present in the drive train. This is therefore in particular a torsion angle that adjusts on the basis of a non-vibrating drive train load if no self-excited vibrations are present.

As is evident from the bottom part of FIG. 7, curve 62 essentially vibrates around this torsion angle $\phi_0$.

The value $A_\phi$ essentially corresponds to the amplitude that the juddering vibration exerts around torsion angle $\phi_0$ according to curve 62.

It may be provided that half wave 64 corresponds to a function that essentially may be expressed as "$-a*\sin(\omega*t)$".

The characteristic of juddering vibration 62, for example may be expressed by $$d^2\phi/dt+\omega^2*\phi=m_0=\text{constant}$$

In this context, $m_0$ represents a constant, while $\phi$ represents the torsion angle and $d^2\phi/dt$ represents the second derivative of the torsion angle.

Boundary conditions may be set here, such as a boundary condition $\phi(0)=_0-A_\phi$ and $[d\phi/dt](0)=0$ and $\phi(T/2)=\phi_0$ and $[d\phi/dt](T/2)=0)$. In this way, exemplary conditions are established in this embodiment that are to be present at instants "0" or "T/2".

Based on these boundary conditions and these characteristics, in this example factor a of the torque modulation may be calculated. In this example—because the torque modulation is supposed to counteract the juddering vibration, that is, in this case $$d^2\phi/dt+\omega^2*\phi=m_0-a*\sin(\omega*t)$$

is applicable—this yields $$a=2*\omega^2 A_\phi/\pi$$

As characteristic 64 in FIG. 7 shows, with an appropriate selection of a, the juddering vibration is essentially eliminated after a half wave (T/2) of this juddering vibration, or the torsion angle of the drive train section essentially corresponds to torsion angle $\phi_0$.

Figure 8:
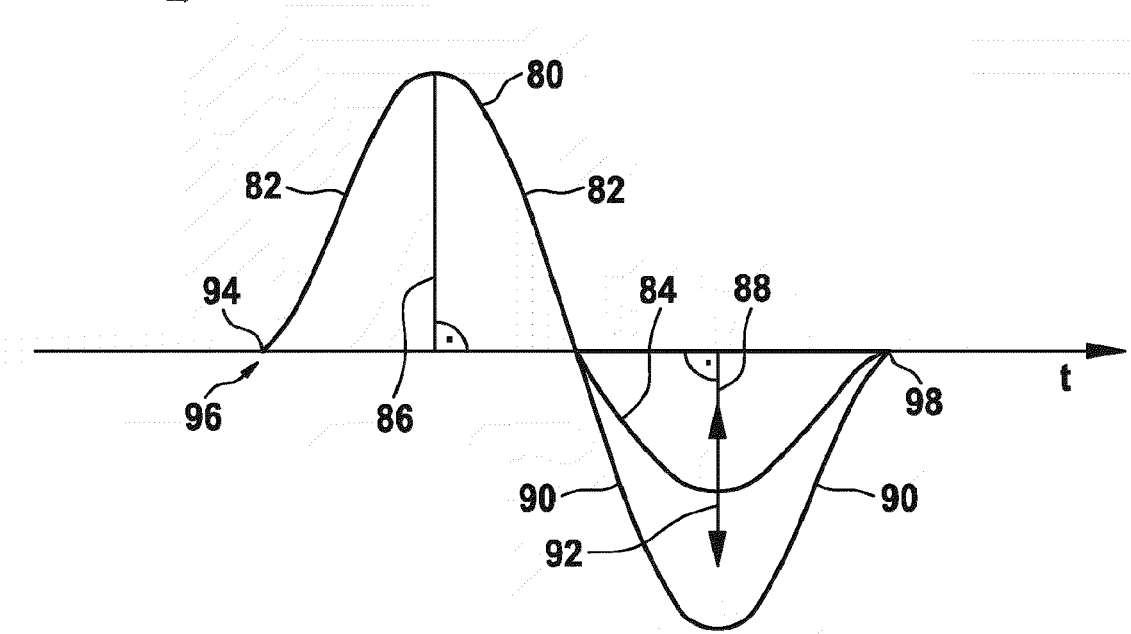
FIG. 8 illustrates an exemplary characteristic of a clutch control travel modulation or a clutch torque modulation.
Figure 9:
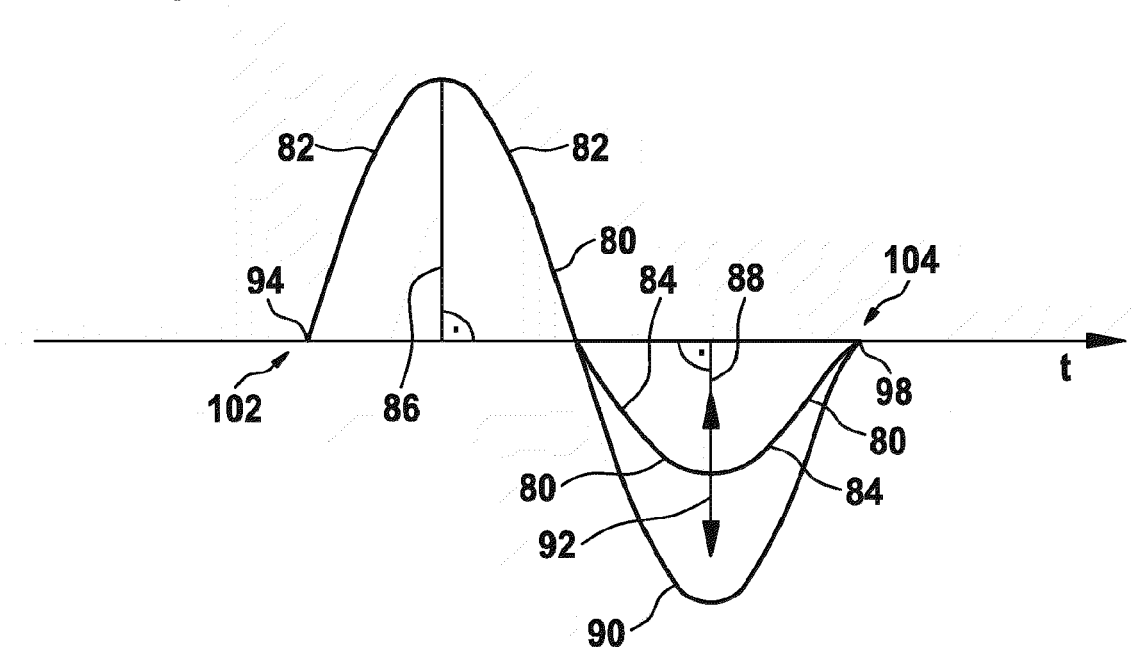
FIG. 9 illustrates an exemplary characteristic of a clutch control travel modulation or a clutch torque modulation.

FIGS. 8 and 9 show two exemplary characteristics of a modulated clutch torque over time in sections. Such a modulated clutch torque may be used in order to counteract juddering vibrations in a drive train.

It should be noted that the time axis that is represented in FIGS. 8 and 9 is displaced in the vertical direction.

In FIGS. 8 and 9, characteristic 80 of the modulated clutch torque has a first half shaft 82 and a second half wave 84.

Amplitude 86 of first half wave 82 is greater than amplitude 88 of second half wave 84. This also becomes clear based on an additional hypothetical half wave 90 depicted in FIGS. 8 and 9, whose theoretical amplitude essentially corresponds to that of first half wave 82. This half wave 90 is shown for comparison, although in another embodiment of the invention a second half wave may also be like this, like that of half wave 90.

Double arrow 92 indicates that the characteristic of second half wave 82 may also be different, the amplitude of second half wave 84 in particular being changed.

The embodiments according to FIGS. 8 and 9 are distinguished in particular by the inward or outward run of the particular half waves 82, 84 of the vibrations.

In FIG. 8 takeoff 94, which is present at the beginning of the period, is essentially such that the time axis or a line parallel to the time axis is placed essentially in the form of a tangent to the takeoff or the modulated clutch torque, as is shown in region 96.

In a corresponding manner, the modulated clutch torque according to FIG. 8 runs out at the end of the period in such a manner that the time axis or a line parallel to the time axis is placed essentially in the form of a tangent to runout 98 or the modulated clutch torque, as is shown in region 100.

In the design according to FIG. 9, the takeoff 94 or the runout 98 at the beginning or end of a period is formed differently, and specifically such that the time axis or an axis parallel thereto is disposed at an angle to the particular tangent in the region of takeoff run 94 or runout 98. This is shown in regions 102 and 104.

What is claimed is:

1. A method for reducing juddering vibrations in a motor vehicle drive train that is loadable by a drive device comprising an internal combustion engine, a clutch device and a transmission device, said method comprising the steps of:
   (i) determining whether juddering vibrations are present;
   (ii) disposing or coupling in or to the motor vehicle drive train a device selected from the group consisting of an internal combustion engine, a clutch device and a transmission device;
   (iii) assigning a rotary parameter to a drive train component, wherein said parameter is torque or speed, and
   (iv) adjusting at least one of said devices to counteract the juddering vibrations, where in response to the adjusting, the rotary parameter is modified and in response to modifying the rotary parameter, the juddering vibration is modified over time.

2. The method as described in claim 1, wherein the adjusting further comprises modulating torque that is transmissible by the clutch device and/or clutch control travel to counteract the juddering vibration.

3. The method as described in claim 2, wherein the adjusting further comprises sinusoidally modulating torque transmissible by the clutch device and/or the clutch control travel.

4. The method as described in claim 2, wherein the juddering vibration comprises at least one predetermined time characteristic and the drive train comprises a component having at least one parameter, said method comprising the step of calculating said at least one predetermined parameter of the time characteristic and/or calculating said at least one parameter of the drive train component.

5. The method as described in claim 4, which comprises the step of calculating a first phase and/or amplitude and/or period of the juddering vibration as a function of transmission input speed.

6. The method as described in claim 4 comprising the step of calculating a first phase and/or amplitude and/or period of modulation of clutch control travel and/or of transmissible clutch torque as a function of transmission input speed.

7. The method as described in claim 4 comprising the step of measuring transmission input speed.

8. The method as described in claim 7, wherein measuring the transmission input speed is performed at set time intervals.

9. The method as described in claim 4, wherein calculated transmission input speed comprises a first at least one local extremum, a first at least one local maximum, said method further comprising the step of calculating a second period and/or phase and/or amplitude as a function of the first at least one local extremum.

10. The method as described in claim 6 comprising the step of calculating a second period and/or phase and/or amplitude for the modulated torque that is transmissible by the clutch device and/or of the modulated clutch control travel as a function selected from the group consisting of the calculated period, the phase, the amplitude of the juddering vibration, and the transmission input speed.

11. The method as described in claim 4, wherein the juddering vibration comprises a parameter and transmission input speed comprises a time characteristic, said method comprising the step of determining the parameter and/or of the time characteristic via an estimate and/or measurement and/or calculation in a first step; and determining the parameter in a second step as a function of the determination of the first step for the improvement and/or monitoring of the precision of the parameter calculated in the first step.

12. The method as described in claim 11 wherein the calculated transmission input speed comprises a second at least one local extremum and a time position and where the parameter comprises the second at least one local extremum or the timing position of the second at least one local extremum.

13. The method as described in claim 4 wherein the juddering vibration comprises a third at least one local extremum, especially a third at least one local maximum, with a first actual position; and the method further comprising: measuring or evaluating transmission input speed to provide speed signals at timed intervals, the signals comprising a fourth at least one local extremum, especially a fourth at least one local maximum, with a second actual position; calculating, in a first step, the timing position of the fourth at least one local extremum, in particular a local extremum in the time characteristic that last occurred; and, calculating and/or further approximating, in a second step, the first and/or second actual position.

14. The method as described in claim 13, which comprises the step of calculating the time interval or time deviation between the fourth at least one local extremum and the first and/or second actual position.

15. The method as described in claim 8, which comprises the step of calculating in a first step a phase angle of the juddering vibration and/or the time characteristic of the transmission input speed, in particular, calculating a local extremum, especially a local maximum of the transmission input speed, where the transmission input speed signals are provided at timed intervals, and calculating in a second step, the deviation between the phase angle detected in the first step and the actual phase angle and/or the deviation of a local extremum calculated in the first step by the actual extremum.

16. The method as described in claim 15 wherein calculating the deviation comprises the step of considering that in the first step, speed signals set at timed intervals, and/or measuring accuracies are used that are made necessary via the speed measurement in the first step.

17. The method as described in claim 15, wherein a prescribed control or evaluation, especially a measured value evaluation, occurs once within a prescribed time window ($T_{int}$), and the method comprises the step of providing or considering a prescribed measured value or measure value pair of a prescribed parameter, such as a transmission input speed, for this time window and considering the provision or consideration of the prescribed value in the calculation of the deviation.

18. The method as described in claim 15, wherein calculating the deviation comprises the further step of considering any increase of the transmission input speed that is essentially independent of the juddering vibration.

19. The method as described in claim 15 wherein calculating the deviation comprises the step of using a parameter selected from the group consisting of interrupt time $T_{int}$ said interrupt time $T_{int}$ being the duration of a time period in which an evaluation, especially a measured value evaluation of angular speed of a transmission input shaft, occurs once and is provided for the one measured value or measured value pair; median, the median indicating the focal point of predetermined measured value pairs, and in particular from assignments of the angular speed of the transmission input shaft to instants at which these angular speeds are present; an instant ($T_{max}$) that is present if a local extremum, especially a local maximum, related to rotary or angular speed signals of the transmission input shaft provided at timed intervals, which was detected as required in a first step, is present or is assigned to it; local extremum, especially a local maximum ($\omega_{max}$) that is related to rotary or angular speed signals of the transmission input shaft, which in some cases was detected in a first step; amplitude of juddering vibration (A) and in particular last amplitude of the juddering vibration; frequency of the juddering vibration ($\omega_{Grabbing}$)/($2*\pi$)); total (average) slope of the angular speed of the transmission input shaft (B); and, angle between two teeth of a travel sensor ($\phi_{pulse}$).

20. The method as described in claim 14, which comprises the steps of determining or approximating via the calculated deviation, an actual local extremum, especially a maximum, of an angular speed of a transmission input shaft and/or determining or approximating the actual phase of the angular speed of the transmission input shaft that is moved, also in a vibratory manner, during the juddering.

21. The method as described in claim 15, which comprises the steps of modulating a reference clutch control travel and/or torque transmissible by the clutch transmission using the phase angle calculated in the first step, and in particular the phase angle of the angular speed of the transmission input shaft and/or the juddering vibration.

22. The method as described in claim 15, which comprises the steps of using a phase angle of the rotary speed and/or the angular speed of the transmission input shaft and/or of the juddering vibration that is at least approximated in a second step to the actual phase angle of this transmission input speed and/or of the juddering vibration; and/or using the deviation for the modulation of the reference clutch control travel and/or of the torque transmissible by the clutch device.

23. The method as described in claim 14, which comprises the steps of changing the period of modulation of reference clutch control travel and/or of the torque transmissible by the clutch device, and in particular in order to at least further approximate the phase angle of this modulated reference clutch control travel and/or torque transmissible by the clutch device to the actual phase angle of the speed of the transmission input shaft, using the time deviation of the time position between an extremum calculated in a first step, especially a local maximum, of the transmission input speed and a value for a local extremum at least approximated in a second step to the time position of an actual extremum, especially a maximum.

24. The method as described in claim 23, wherein changing the period of the modulation comprises changing the period of the modulation of the reference clutch control travel and/or of the torque transmissible by the clutch device in such a manner that the period is extended or shortened for a period by this deviation.

25. The method as described in claim 21, which comprises modulating the reference clutch control travel and/or the torque transmissible by the clutch device as a function of the detected local extremum, especially local maximum, and/or of its time position and/or of a calculated deviation in order to counteract the juddering vibrations.

26. The method as described in claim 1, wherein adjusting the device (iv) is performed by changing the position of a drive train component to counteract detected juddering vibrations, where the position change is prescribed according to a predetermined function, especially a time function, that has a ramp function; and, in response to changing the position, changing a rotary parameter of a drive train component.

27. The method as described in claim 1 comprising determining whether there are juddering vibrations in a motor vehicle drive train; changing the position of a device to counteract juddering vibrations, whereby the juddering vibrations are counteracted by the change in the position of the device in first time segments and the change in the position of the device is interrupted in second time segments so that the system may vibrate freely in these two time segments; and, in response changing the position of this device, changing a rotary parameter of a drive train component.

28. The method as described in claim 26 wherein the device is the clutch device; and the method comprises modulating the torque transmissible by the clutch device and/or the clutch control travel, especially a reference clutch control travel, in order to counteract the juddering vibrations.

29. The method as described in claim 28, wherein the ramp function comprises a section in which a ramp is run up from a starting value to a value and a section situated later in time in which a ramp is driven back down from this value to a final value and in particular to a final value that corresponds to the starting value.

30. The method as described in claim 29, wherein the ramp function comprises at least one first section in which a ramp is driven up from a starting value to a value and at least one second section subsequent to the first section in which the ramp function is held to this constant value, and at least one third section in turn succeeding the second in which the ramp function is driven down from the constant value to a final value, and in particular to a final value that corresponds to the starting value.

31. The method as described in claim 30, wherein the constant value is essentially equal to "one".

32. The method as described in claim 31, wherein the starting value and the final value of the ramp function in each case equals "zero".

33. The method as described in claim 32, which comprises specifying the modulated clutch control travel as a function of an adjustment factor and in particular as a function of an adjustment constant.

34. The method as described in claim 33, which comprises specifying the modulated clutch control travel as a function of an amplitude of the juddering vibrations and in particular as a function of the last amplitude found.

35. The method as described in claim 34, which comprises determining the modulated clutch control travel as a function of a sine function and in particular as a function of a sine function that depends on frequency of the judder and/or of time and/or of a determined phase shift between juddering vibration and the characteristic of the travel modulation.

36. The method as described in claim 34, which comprises determining the modulated clutch control travel as a function of an amplitude of the juddering vibration and as a function of a sine function, the amplitude being updated at the zero crossing of the sine function and in particular as a function of the transmission input speed.

37. The method according to claim 26, wherein adjusting the device (iv) is performed by alternately changing the position of a device selected from the group consisting of the transmission device and the clutch device, especially clutch control travel modulation, in first time segments and the excluded change of this position in second time segments until it detecting that the amplitude of the juddering vibration is smaller than a prescribed shutoff threshold.

38. The method as described in claim 37, wherein the duration of the first time segments corresponds to between one and five judder periods, especially two to three judder periods.

39. The method as described in claim 37, which comprises specifying the modulated clutch control travel as a function of a phase shift between the juddering vibration and the characteristic of the actual travel modulation and/or as a function of a sine function that is a function of the phase shift; and, updating a current phase shift in two time periods.

40. The method as described in claim 37, which comprises specifying the modulated clutch control travel as a function of a phase shift between the juddering vibration and the characteristic of the actual travel modulation and/or as a function of a sine function that is a function of this phase shift; and, considering a current phase shift in first time periods for the clutch control travel modulation as a constant and in particular at least partially corresponding to a value that was calculated of a previous second period.

41. The method as described in claim 1, which comprises the steps of determining whether juddering vibrations are present in a motor vehicle drive train; disposing a clutch device in this drive train that can be operated in a slip mode; and modulating the torque transmissible by the clutch device and/or of the clutch control travel to counteract the detected juddering vibrations, whereby the modulation is such that there is control of a modulated reference clutch torque, which is specified as the difference between the unmodulated clutch torque and a product, whereby this product, furthermore, has a first factor that is a function of the angular speed of a clutch plate and/or the angular speed of a transmission input shaft and/or the angular speed of a wheel of the motor vehicle and/or a ratio that is assigned to a gear which is shifted in a transmission device disposed in a drive train, and whereby, furthermore, this adjustment constant is a function of parameters of the vibrating drive train system and/or of parameters that describe or at least assist in describing the friction characteristic of the clutch device.

42. The method as described in claim 1, which comprises determining whether juddering vibrations are present in a motor vehicle drive train; disposing a clutch device in this drive train that can be operated in a slip mode; and, modulating torque transmissible by the clutch device and/or the clutch control travel to counteract detected juddering vibrations, whereby the modulation is such that there is control of a modulated reference clutch torque, which is specified as the difference between unmodulated clutch torque and a product, whereby this product, furthermore, has a first factor that is a function of the angular speed of a clutch plate and/or the angular speed of a transmission input shaft and/or the angular speed of a wheel of the motor vehicle and/or a ratio that is assigned to a gear which is shifted in a transmission device disposed in a drive train, and whereby, furthermore, this adjustment constant is a function of the reference clutch torque and/or of a nominal clutch torque that is calculated assuming a nominal friction value and/or is a function of a calculated slip.

43. The method as described in claim 41, wherein the adjustment constant is a function of a function that describes how the coefficient of friction of the clutch device changes via the slip of the clutch device, and/or a function of the time derivative of such a function.

44. The method as described in claim 41, wherein the adjustment constant is a function of period T of the juddering vibration.

45. The method as described in claim 41, wherein the adjustment constant is a function of the moment of inertia of a clutch plate and/or of the transmission input.

46. The method as described in claim 41, wherein the adjustment constant is a function of a nominal coefficient of friction of the clutch device.

47. The method as described in claim 41, wherein the adjustment constant is a function of a quotient of two amplitudes of the juddering vibration that follow one after the other in time sequence and in particular of the logarithm of such a quotient.

48. The method as described in claim 26, which comprises building up the ramp to its target value within approximately one period of the juddering vibration.

49. The method as described in claim 1, which comprises determining whether juddering vibrations are present in a motor vehicle drive train; disposing a clutch device within the drive train that is operable in a slip mode; and, modulating the torque transmissible by the clutch device and/or of the clutch control travel to counteract detected juddering vibrations, whereby this modulation is such that the modulation is carried out in different sections according to a different characteristic.

50. The method as described in claim 1, which comprises determining whether juddering vibrations are present in a motor vehicle drive train; disposing a clutch device within the drive train that is operable in a slip mode; and, modulating the torque transmissible by the clutch device and/or of the clutch control travel to counteract detected juddering vibrations, whereby this modulation is such that it is designed in a vibratory manner and has a first half wave and as required a second half wave whereby the amplitude of the first half wave is greater than the amplitude of the second half wave.

51. The method as described in claim 50, which comprises interrupting or terminating the modulation according to the second half wave, and calculating the phase of the juddering vibration, and in particular via at least one local extremum, such as a local maximum, of the juddering vibration and/or of the transmission input speed.

52. The method as described in claim 50, wherein the amplitude of the second half wave is equal to zero.

53. The method as described in claim 51, which comprises interrupting or terminating the modulation according to the first half wave and, calculating the phase of the juddering vibration, and in particular via at least one local extremum, such as a local maximum, of the juddering vibration and/or of the transmission input speed.

54. The method as described in claim 50, wherein the first half wave and/or the second half wave is a half wave of a sinusoidal vibration.

55. The method as described in claim 2, which comprises starting the modulation with a phase shift in relation to the juddering vibration.

56. The method as described in claim 55, which comprises detecting a local extremum, especially a local maximum, of the juddering vibration; and, in response thereto starting the modulation.

57. The method as described in claim 2, which comprises the steps of forming the modulation in such a manner that a tangent of the time characteristic of the modulation of the transmissible torque and/or of the clutch control travel at the beginning and/or at the end of a half wave runs essentially parallel to the time axis.

58. The method as described in claim 1, which comprises the steps of determining whether juddering vibrations are present in a motor vehicle drive train; disposing a clutch device within the drive train that is operable in a slip mode, and modulating the torque transmissible by the clutch device and/or the clutch control travel to counteract detected juddering vibrations, wherein the modulation is such that the modulation is determined as a function of the juddering vibration and/or the parameters describing the juddering vibration and/or a function describing the juddering vibration and as a function of prescribed boundary conditions.

59. The method as described in claim 58, which comprises the step of describing the juddering vibration especially as a function of the torsion angle of a predetermined drive train section.

60. The method as described in claim 58, which comprises the steps of prescribing the characteristic of the modulation as a function of variables, and prescribing these variables at least partially on the basis of the boundary conditions.

61. The method as described in claim 58, wherein a boundary condition comprises the torsion angle at the instant "zero" corresponding to the difference between the torsion angle that would be present in the given load scenario while disregarding the juddering vibration and the angle amplitude corresponds to the juddering vibration.

62. The method as described in claims 58, wherein a boundary condition comprises the time derivative of the torsion angle at the "zero" instant being equal to "zero".

63. The method as described in claim 58, wherein a boundary condition comprises a torsion angle at the instant of the half period of the juddering vibration corresponding to the torsion angle that would be present in the given load scenario while disregarding the juddering vibration.

64. The method as described in claim 58, wherein a boundary condition comprises the time derivative of the torsion angle at the instant of the half period of the juddering vibration being equal to "zero".

65. The method as described in claim 58, wherein the period of the modulation of the torque transmissible by the clutch device and/or of the clutch control travel corresponds to the half period of the juddering vibration.

66. The method as described in claim 58, which comprises the steps of modulating the torque transmissible by the clutch device and/or the clutch control travel by an amount corresponding to a function a*sin(co*t), a being a factor, ωcorresponding to 2*π times the frequency of the modulation vibration and t being the time.

* * * * *

UNITED STATES PATENT AND TRADEMARK OFFICE
CERTIFICATE OF CORRECTION

PATENT NO. : 7,299,120 B2
APPLICATION NO. : 10/906907
DATED : November 20, 2007
INVENTOR(S) : Boris Serebrennikov It is certified that error appears in the above-identified patent and that said Letters Patent is hereby corrected as shown below:

Column 30, line 10 should read:

corresponding to a function a*sin(ω*t), a being a factor

Signed and Sealed this

Sixth Day of May, 2008

JON W. DUDAS
*Director of the United States Patent and Trademark Office*